US005553963A

United States Patent [19]

Hoy et al.

[11] Patent Number: 5,553,963

[45] Date of Patent: Sep. 10, 1996

[54] CLAMP DEVICE FOR A LADDER ADJUSTMENT APPARATUS

[76] Inventors: Thomas A. Hoy; Mark D. Scherer, both of 2906 Stuart St., Denver, Colo. 80212

[21] Appl. No.: 354,164

[22] Filed: Dec. 8, 1994

[51] Int. Cl.[6] .......... F16B 2/12

[52] U.S. Cl. .......... 403/164; 403/24; 403/385; 403/DIG. 9; 182/108; 182/204; 248/231.41

[58] Field of Search .......... 403/164, 384, 403/385, 24, 49, 11–12, DIG. 9, 405.1, 406.1, 407.1; 182/201, 203–205, 107–108, 214; 248/229.12, 229.22, 228.3, 231.41, 188.2; 24/525, 486

[56] References Cited

U.S. PATENT DOCUMENTS

| | | | |
|---|---|---|---|
| 783,259 | 2/1905 | Friend | 182/107 |
| 1,236,269 | 8/1917 | Cole | 248/231.41 X |
| 1,462,505 | 7/1923 | Hunt | 182/201 |
| 2,245,306 | 6/1941 | Smith | 182/203 |
| 2,608,336 | 8/1952 | Dole | 24/525 X |
| 2,945,713 | 7/1960 | Sears | 403/164 X |
| 3,165,170 | 1/1965 | Blaney | 182/203 |
| 3,170,708 | 2/1965 | Miller | 24/525 X |
| 3,908,796 | 9/1975 | Hurwitz | 182/201 |
| 4,133,085 | 1/1979 | Hansson | 24/486 |
| 4,209,078 | 6/1980 | Gerber | 182/203 |
| 4,607,726 | 8/1986 | Davis et al. | 182/204 |
| 4,671,383 | 6/1987 | Huang | 182/204 |
| 4,984,655 | 1/1991 | Scherer et al. | 182/204 |
| 5,286,211 | 2/1994 | McIntosh | 24/486 X |

FOREIGN PATENT DOCUMENTS

| | | | |
|---|---|---|---|
| 25200 | 12/1905 | United Kingdom | 182/107 |

*Primary Examiner*—Kenneth J. Dorner
*Assistant Examiner*—Harry C. Kim
*Attorney, Agent, or Firm*—Henderson & Sturm

[57] ABSTRACT

A clamp device 10 including both fixed 10" and moveable versions 10' attached to a portion of a ladder adjustment apparatus 110 for engaging the rungs 101 of a ladder 100. The device 10 comprises a lower generally C-shaped jaw member 20 having a recess 26 to receive an adapter member 50 to grasp the rung of the ladder 100. The lower jaw member 20 is pivotally connected to a portion of the ladder adjustment apparatus 110 to accommodate the angular orientation of the adjustment apparatus 110 relative to the rungs 101 of the ladder 110.

13 Claims, 2 Drawing Sheets

CLAMP DEVICE FOR A LADDER ADJUSTMENT APPARATUS

TECHNICAL FIELD

The present invention relates to the field of clamping mechanisms in general, and in particular to a clamp device specifically designed to be incorporated into a ladder adjustment apparatus.

BACKGROUND ART

This invention is an improvement over the subject matter of U.S. Pat. No. 4,984,655 that issued on Jan. 15, 1991 and entitled "LADDER ADJUSTMENT APPARATUS", the content of which is incorporated herein by reference.

As shown by reference to the following U.S. Pat. Nos. 4,984,655; 4,671,383; 4,607,726; and 4,209,078; the prior art is replete with myriad and diverse clamp devices used to secure ladder rungs in ladder adjustment apparatus.

While all of the aforementioned prior art constructions are more than adequate for the basic purpose and function for which they have been specifically designed, these patented structures are also uniformly deficient in the construction clamp mechanisms which form the operative engagement between the rungs of the ladder and the main body of the ladder adjustment apparatus.

In particular, in those instances wherein the ladder adjustment apparatus is deployed on uneven terrain, the adjustable leg unit of the adjustment apparatus is angularly deployed relative to both the vertical support legs and the horizontal ladder rungs. The clamps are also designed to allow extension ladders to extend without rung binding or interference during extension. Some ladders don't have much room between rungs during extension by design and this clamp accommodates any ladder and rung design. Prior rung clamp art does not.

As a consequence of the foregoing situation, there has existed a longstanding need among consumers for a new type of clamp device to be employed with ladder adjustment apparatus wherein the clamp device is both rotatable with respect to the adjustable support leg of the ladder adjustment apparatus as well as being adjustable to accommodate ladder rungs of different widths. The provision of such a construction is a stated objective of the present invention.

DISCLOSURE OF THE INVENTION

Briefly stated, the clamp device that forms the basis of the present invention comprises both fixed and moveable versions of the device that are operatively connected to both the upper and lower portions respectively of a ladder adjustment apparatus wherein the ladder adjustment apparatus may assume an angular orientation relative to the ladder rungs due to uneven terrain; and ladder stability because it will extend beyond ladder leg if needed because of angular orientation.

The clamp device comprises in general an upper and lower jaw member wherein the lower jaw member is pivotally associated with the ladder adjustment apparatus and the upper jaw member is operatively associated with the lower jaw member to captively engage the upper and lower portions of the ladder rungs.

As will be explained in greater detail further on in the specification, the lower jaw member is further provided with a contoured adapter member which enhances the frictional engagement between the lower jaw member and a ladder rung when the upper jaw member forces the ladder rung into engagement with the adapter member and the lower jaw member. The contoured adapter is provided to accommodate triangular rungs or round rungs which range from 1" to 1¼" in diameter and is also removable to hang on chain to accommodate wider half round flat on top rungs. This clamp should accommodate any shape or size rung known today. Also, contoured adapter forces rungs to opening end of clamp to allow no binding or interference between rungs during extension.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
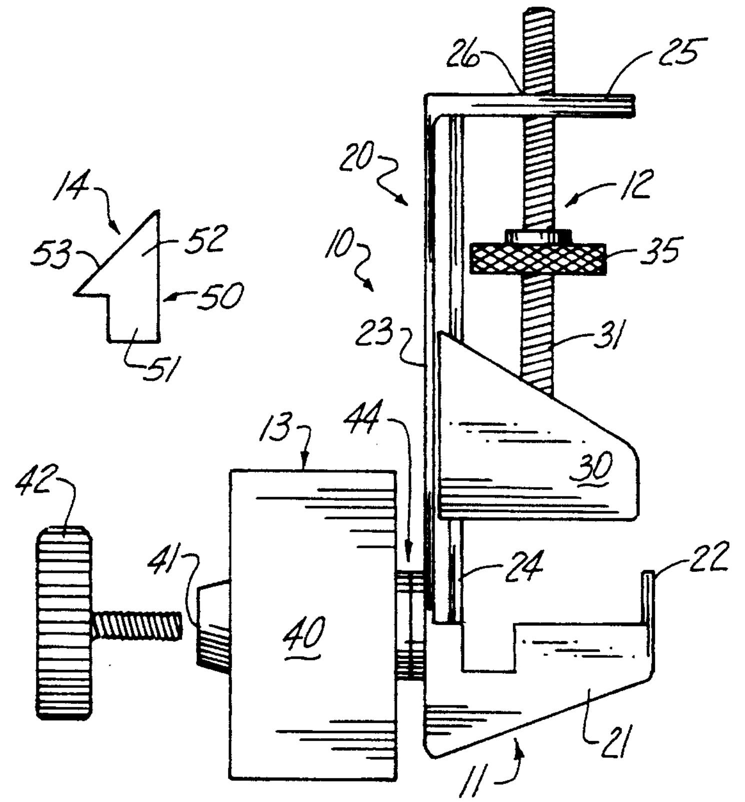
FIG. 1 is a side plan view of the moveable version of the clamp devices that forms the basis of the present invention.

As can be seen by reference to the drawings, and in particular to FIG. 1, the clamp device that forms the basis of the present invention is designated generally by the reference number 10. The device 10 comprises in general, a stationary jaw unit 11, a moveable jaw unit 12, a mounting unit 13 and a rung adapter unit 14.

Figure 4:
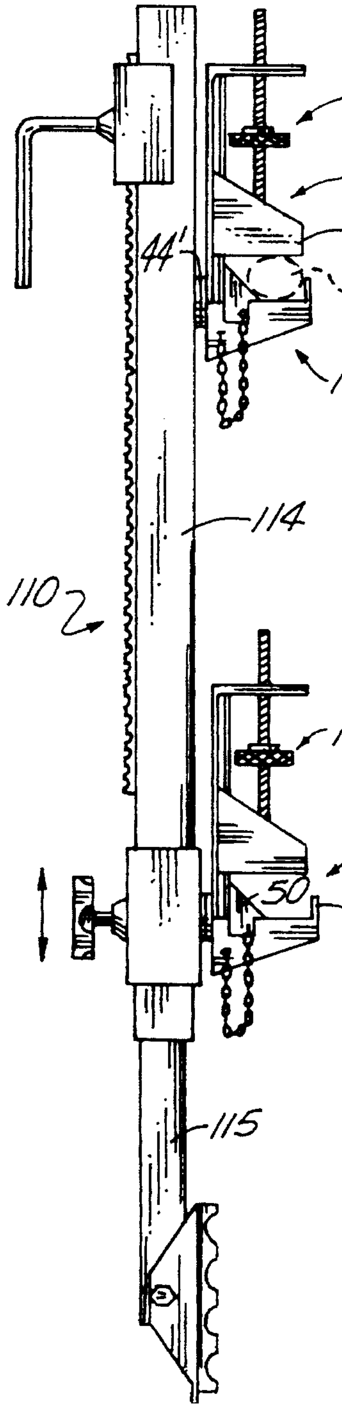
FIG. 4 is an enlarged detail view of the relative position of both the moveable and fixed clamp devices on the outer portion of the support leg.

Turning now to FIG. 4, it can be seen that the device 10 encompasses both a moveable version 10', disposed on the lower portion of the outer tubular member 114 which surrounds the support leg 115 of a ladder adjustment apparatus 110 and a fixed version 10" which is disposed on the upper portion of the outer tubular member 114.

In the moveable version of the device 10' illustrated in FIG. 1, it can be seen that the stationary jaw unit 11 comprises in general a generally C-shaped lower jaw member 20 having an enlarged lower jaw element 21 provided with a raised lip 22 on the outboard end and enlarged recess 29 formed proximate the inboard end.

In addition, the intermediate portion 23 of the C-shaped jaw member 20 is provided with a guide plate 24 and the upper portion 25 of the C-shaped jaw member 20 is provided with a threaded aperture 26. The purpose and function of the guide plate 24 and the threaded aperture 26 will be described presently.

Figure 2:
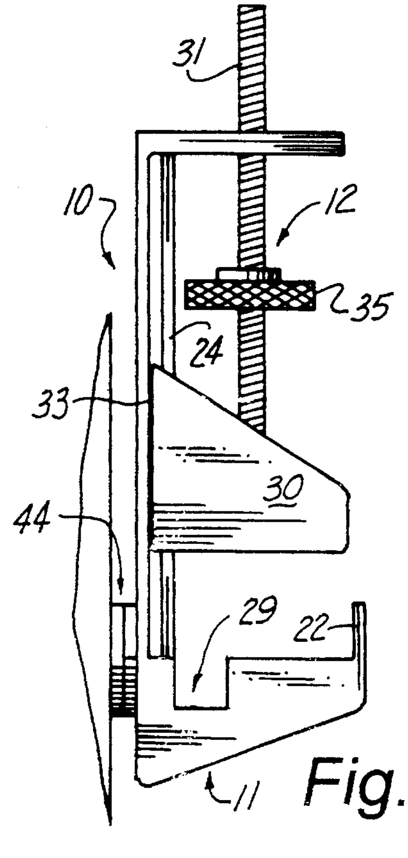
FIG. 2 is a side plan view of the fixed version of the clamp device that forms the basis of the present invention.

As shown in FIGS. 1 and 2, the moveable jaw unit 12 comprises an enlarged upper jaw member 30 having an elongated threaded rod element 31 projecting upwardly from the top of the jaw member 30. The threaded rod element 31 is dimensioned to be operatively received in the threaded aperture 26 of the stationary jaw unit 11.

Furthermore, the inboard end 33 of the upper jaw member 30 is dimensioned to be slidable relative to the guide plate 24 of the lower jaw member 20. The threaded rod element 31 of the upper jaw member 33 is further provided with a knurled washer 35 for moving the upper jaw member 30 towards and away from the lower jaw element 21 in a well recognized fashion.

Figure 3:
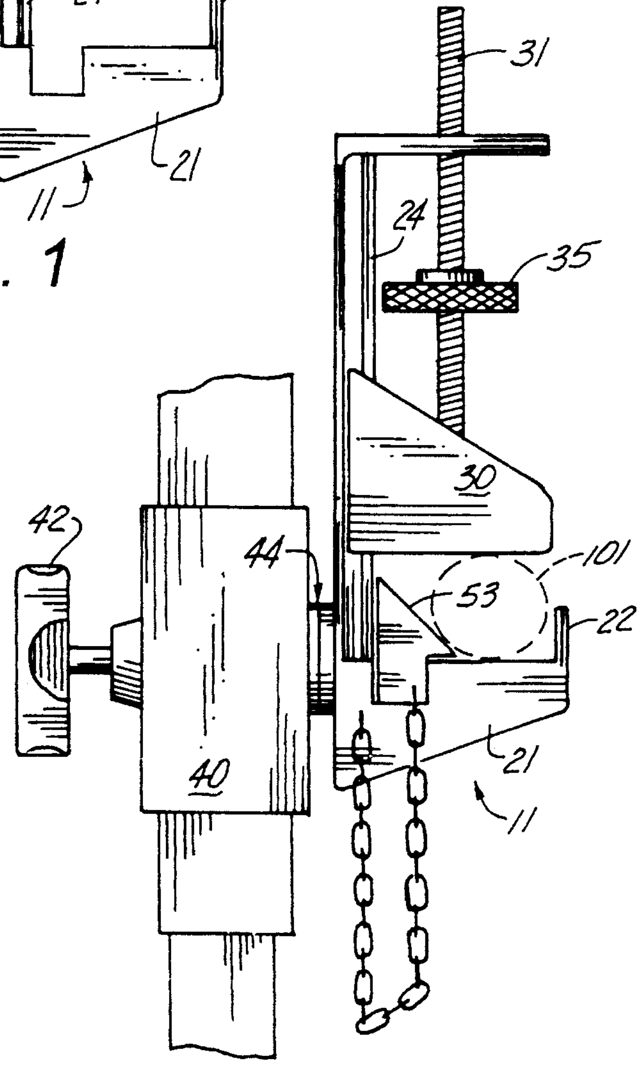
FIG. 3 is a side plan detail view of the adaptor wedge employed with the clamp device.
Figure 5:
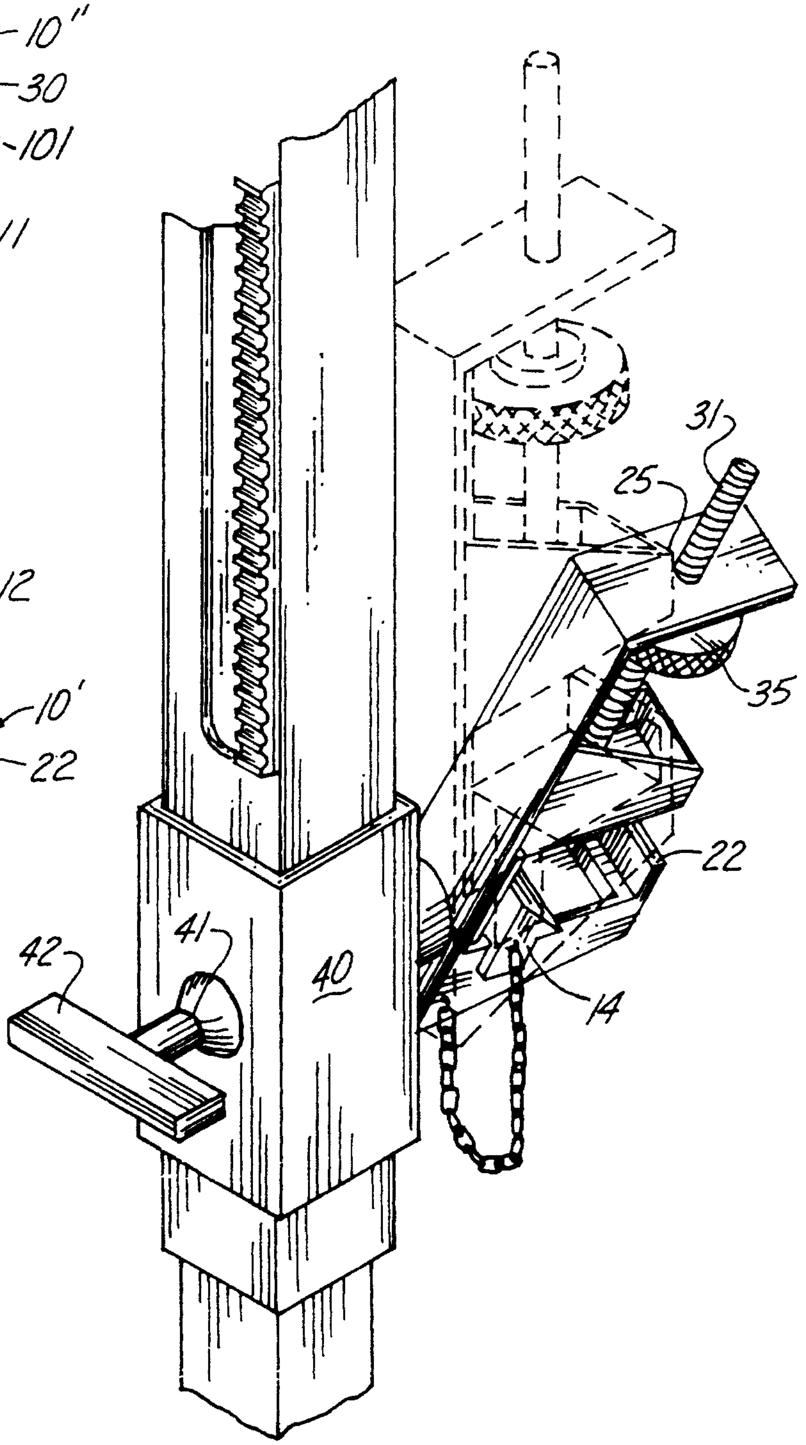
FIG. 5 is an isolated perspective view of the moveable clamp device deployed on the outer portion of the support leg.

In the moveable version of the invention illustrated in FIGS. 1, 3, and 5, the mounting unit 13 comprises a collar member 40 dimensioned to slidable receive the outer tubular member 114 of the ladder adjustment apparatus 110. One side of the collar member 40 is provided with a threaded aperture 41 for receiving a threaded locking element 42 to frictionally secure the collar member 40 to the outer tubular member 114. The other side of the collar member 40 is provided with a pivoted connector element 44 that operatively and rotatably connects the fixed jaw member 20 to the collar member 40.

As can best be seen by reference to FIG. 4, the mounting unit 13 allows the device 10 to be selectively positioned at a desired vertical height on the lower portions of the outer tubular member 114 of the ladder adjustment apparatus 110.

Turning now to FIG. 4, it can be seen that the fixed version of the device 10' is connected directly to the upper portion of the outer tubular member 114 of the ladder adjustment apparatus 110 via a pivoted connector element 44' such that the device 10' may be rotated relative to the outer tubular member 114.

As can best be seen by reference to FIGS. 1, 3, and 4, the adapter unit 14 comprises a removable contoured adaptor member 50 having a generally rectangular lower portion 51 dimensioned to be received in the enlarged recess 29 in the fixed jaw element 21 and having an enlarged generally upper portion 52 having an angled face 53 adapted to cooperate with the outboard raised lip 22 of the lower jaw element 21 to wedge the lower portion of a ladder rung 101 while the upper jaw member 30 captively engages the upper portion of the ladder rung 101.

As can be seen in particular by reference to FIG. 5, there are certain instances wherein the uneveness of the terrain will cause the support leg 115 of the ladder adjustment apparatus 110 to be angularly disposed other than 90° relative to the ladder rungs (not shown). In those instances, it is imperative that both the fixed and moveable versions of the clamp device 10 be rotatable via the pivoted connector element 44 to accommodate the angular displacement.

It should further be noted that the contoured adapter member 50 is preferably fabricated from resilient material to enhance the frictional engagement of the adapter member 50 with the ladder rung.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. A clamp device for operatively and rotatably connecting a ladder adjustment apparatus to at least one rung of a plurality of rungs of a conventional ladder wherein, the device comprises:

a lower generally C-shaped jaw member having an enlarged lower jaw element, an intermediate portion, and an upper portion wherein, the lower jaw element is provided with a raised lip disposed on an outboard end;

an upper jaw member operatively associated with the upper portion of the C-shaped jaw member; and means for rotatably connecting the C-shaped jaw member to a portion of the ladder adjustment apparatus wherein the lower jaw element is further provided with an enlarged recess and wherein the device further comprises a contoured adapter member having a lower portion dimensioned to be received in said enlarged recess.

2. The clamp device as in claim 1 wherein the adapter member is further provided with a generally triangular upper portion dimensioned to engage a lower portion of said at least one rung.

3. The clamp device as in claim 2 wherein the generally triangular upper portion of said adapter member is resilient.

4. The clamp device as in claim 1 wherein said means for rotatably connecting the C-shaped jaw member to said portion of the ladder adjustment apparatus comprises a pivoted connector element.

5. The clamp device as in claim 4 wherein said means further comprises a collar member dimensioned to surround said portion of the ladder adjustment apparatus wherein the pivoted connector element is secured on one end to the C-shaped jaw member and secured on the other end to the collar member.

6. The clamp device as in claim 5 wherein the collar member is further provided with a threaded locking element for securing the collar member to said portion of the ladder adjustment apparatus.

7. A clamp device for operatively and rotatably connecting a ladder adjustment apparatus to at least one rung of a plurality of rungs of a conventional ladder wherein, the device comprises:

a lower generally C-shaped jaw member having an enlarged lower jaw element, an intermediate portion, and an upper portion wherein, the lower jaw element is provided with a raised lip disposed on an outboard end;

an upper jaw member operatively associated with the upper portion of the C-shaped jaw member; and means for rotatably connecting the C-shaped jaw member to a portion of the ladder adjustment apparatus wherein the intermediate portion of the C-shaped jaw member is provided with a guide plate and the inboard end of the upper jaw member is dimensioned to receive said guide plate.

8. The clamp device as in claim 7 wherein the lower jaw element is further provided with an enlarged recess and wherein the device further comprises a contoured adapter member having a lower portion dimensioned to be received in said enlarged recess.

9. The clamp device as in claim 8 wherein the adapter member is further provided with a generally triangular upper portion dimensioned to engage a lower portion of said at least one rung.

10. The clamp device as in claim 9 wherein the generally triangular upper portion of said adapter member is resilient.

11. The clamp device as in claim 7 wherein said means for rotatably connecting the C-shaped jaw member to said portion of the ladder adjustment apparatus comprises a pivoted connector element.

12. The clamp device as in claim 11 wherein said means further comprises a collar member dimensioned to surround said portion of the ladder adjustment apparatus wherein the pivoted connector element is secured on one end to the C-shaped jaw member and secured on the other end to the collar member.

13. The clamp device as in claim 12 wherein the collar member is further provided with a threaded locking element for securing the collar member to said portion of the ladder adjustment apparatus.

* * * * *